United States Patent
Cho et al.

(10) Patent No.: US 9,502,996 B2
(45) Date of Patent: Nov. 22, 2016

(54) MOTOR DRIVING DEVICE AND AIR CONDITIONER INCLUDING THE SAME

(71) Applicant: LG ELECTRONICS INC., Seoul (KR)

(72) Inventors: Wonwoo Cho, Changwon-si (KR); Gwigeun Park, Changwon-si (KR); Youngsoo Seo, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 14/566,282

(22) Filed: Dec. 10, 2014

(65) Prior Publication Data
US 2015/0171775 A1 Jun. 18, 2015

(30) Foreign Application Priority Data

Dec. 10, 2013 (KR) ........................ 10-2013-0153374

(51) Int. Cl.
| | | |
|---|---|---|
| H02P 5/00 | (2016.01) | |
| H02M 7/02 | (2006.01) | |
| H02M 1/42 | (2007.01) | |
| F25B 49/02 | (2006.01) | |
| H02M 5/44 | (2006.01) | |
| H02M 1/00 | (2006.01) | |
| H02M 3/158 | (2006.01) | |

(52) U.S. Cl.
CPC ............... *H02P 5/00* (2013.01); *F25B 49/025* (2013.01); *H02M 1/4225* (2013.01); *H02M 5/44* (2013.01); *H02M 2001/0058* (2013.01); *H02M 2003/1586* (2013.01); *Y02B 70/126* (2013.01); *Y02B 70/1491* (2013.01)

(58) Field of Classification Search
None
See application file for complete search history.

(56) References Cited

U.S. PATENT DOCUMENTS

| | | | | |
|---|---|---|---|---|
| 5,283,727 | A * | 2/1994 | Kheraluwala | H02M 1/4208 363/132 |
| 5,654,882 | A * | 8/1997 | Kanazawa | H02M 5/458 363/37 |
| 8,184,456 | B1 * | 5/2012 | Jain | H02M 5/29 363/21.02 |
| 8,817,506 | B2 * | 8/2014 | Shimomugi | H02M 3/1584 323/272 |

FOREIGN PATENT DOCUMENTS

JP 2013-178004 A 9/2013

OTHER PUBLICATIONS

Carlos Marcelo De Oliveira Stein et al.: "A ZCT Auxiliary Commutation Circuit for Interleaved Boost Converters Operating in Critical Conduction Mode", IEEE Transactions on Power Electronics, Institute of Electrical and Electronics Engineers, USA, vol. 17, No. 6, Nov. 1, 2002, XP011078230, ISSN: 0885-8993 *figure 1*.

(Continued)

*Primary Examiner* — Emily P Pham
(74) *Attorney, Agent, or Firm* — KED & Associates, LLP

(57) ABSTRACT

A motor driving device and an air conditioner including the same are disclosed. The disclosed motor driving device includes a rectifier to rectify input AC power, and a converter to convert the power rectified by the rectifier into DC power. The converter includes an interleaved converter including a first converter and a second converter, which operate in an interleaved manner. The first converter of the interleaved converter includes a first boost converter, and a first resonator including a passive element connected to the first boost converter, to perform resonation. Accordingly, it is possible to reduce switching loss generated upon power conversion.

17 Claims, 15 Drawing Sheets

(56) References Cited

OTHER PUBLICATIONS

Yao-Ching Hsieh et al.: "An Interleaved Boost Converter with Zero-Voltage Transition", IEEE Transactions on Power Electronics Engineers, USA, vol. PE-1, No. 4, Apr. 1, 2009, pp. 973-978, XP011252779, ISSN: 0885-8993 *the whole document*.

Doo-Yong Jung et al.: "Interleaved Soft-Switching Boost Converter for Photovoltaic Power-Generation System", IEEE Transactions on Power Electronics Engineers, USA, vol. 26, No. 4, Apr. 1, 2011, pp. 1137-1145, XP011355384, ISSN: 0885-8993, DOI: 10.1109/TPEL. 2010.2090948 *the whole document*.

European Search Report issued in Application No. 14197000.4 dated Apr. 16, 2015.

\* cited by examiner

+

MOTOR DRIVING DEVICE AND AIR CONDITIONER INCLUDING THE SAME

CROSS-REFERENCE TO RELATED APPLICATION

This application claims priority under 35 U.S.C. §119 to Korean Application No. 10-2013-0153374, filed on Dec. 10, 2013, in the Korean Intellectual Property Office, whose entire disclosure is incorporated hereby by reference.

BACKGROUND

1. Field

The present disclosure relates to a motor driving device and an air conditioner including the same, and more particularly to a motor driving device capable of reducing switching loss generated upon power conversion and an air conditioner including the same.

2. Background

An air conditioner is installed to provide a pleasant indoor environment to persons by adjusting indoor temperature and conditioning indoor air through discharge of hot or cold air into an indoor space. Generally, such an air conditioner includes an indoor unit installed in an indoor space while including a heat exchanger, and an outdoor unit including a compressor and a heat exchanger, to supply refrigerant to the indoor unit.

BRIEF DESCRIPTION OF THE DRAWINGS

The embodiments will be described in detail with reference to the following drawings in which like reference numerals refer to like elements wherein.

DETAILED DESCRIPTION

Figure 1:
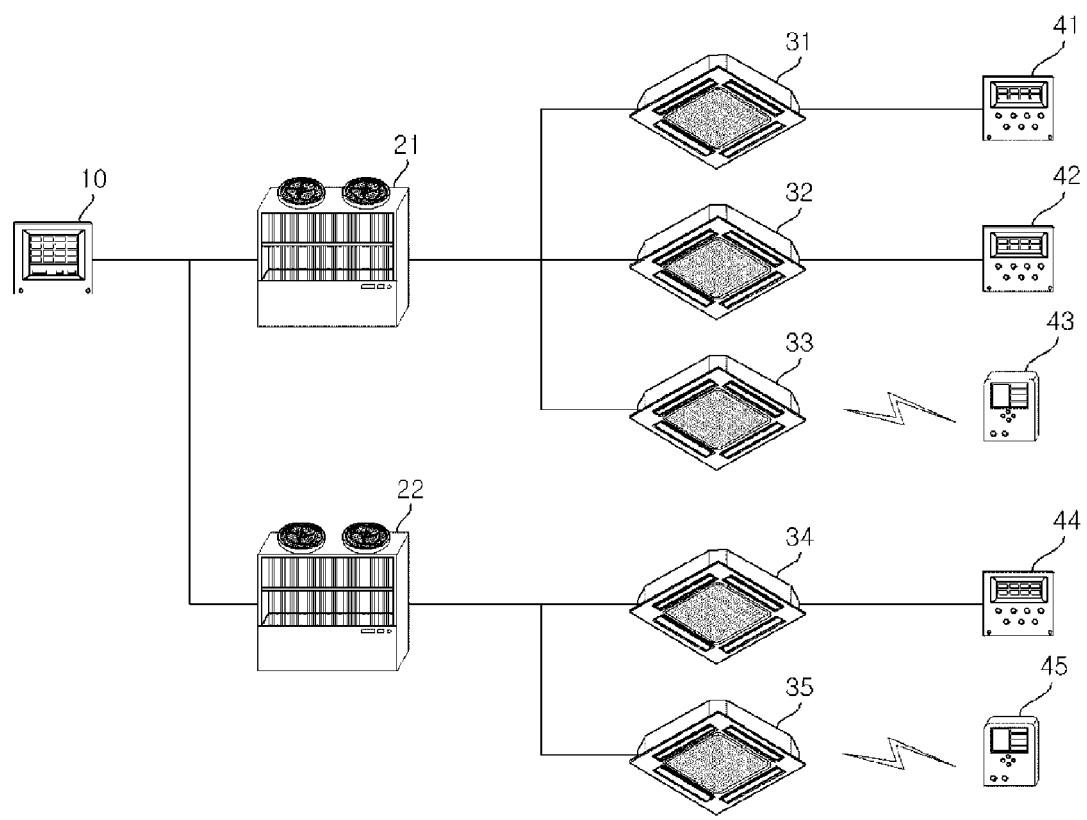
FIG. 1 is a view illustrating a configuration of an air conditioner according to an embodiment of the present disclosure.

FIG. 1 is a view illustrating a configuration of an air conditioner according to an embodiment of the present disclosure. The air conditioner may include a plurality of indoor units 31 to 35, a plurality of outdoor units 21 and 22 each connected to associated ones of the indoor units 31 to 35, and remote controllers 41 to 45 connected to respective indoor units 31 to 35. The air conditioner may further include a remote control unit 10 to control the plural indoor units 31 to 35 and outdoor units 21 and 22.

The remote control unit 10 is connected to the indoor units 31 to 36 and outdoor units 21 and 22, and monitors and controls operations of the indoor units 31 to 36 and outdoor units 21 and 22. In this case, the remote control unit 10 may perform operation setting, lock setting, schedule control, group control, etc. for the indoor units 31 to 36 connected thereto.

As the air conditioner, any one of a stand type air conditioner, a wall-mounted air conditioner and a ceiling-mounted air conditioner is applicable. For convenience of description, however, the following description will be given only in conjunction with a ceiling-mounted air conditioner. Meanwhile, the air conditioner may further include at least one of a ventilator, an air cleaner, a humidifier, and a heater. These devices may be operatively connected to the indoor units and outdoor units.

Each of the outdoor units 21 and 22 includes a compressor (not shown) for compressing refrigerant supplied thereto, an outdoor heat exchanger (not shown) for exchanging heat between refrigerant and outdoor air, an accumulator (not shown) for separating gaseous refrigerant from refrigerant supplied thereto, and supplying the separated gaseous refrigerant to the compressor, and a 4-way valve (not shown) for selecting a flow path of refrigerant according to heating operation. Although each of the outdoor units 21 and 22 further includes a plurality of sensors, a plurality of valves, and an oil collector, etc., no description will be given of configurations of these elements.

Each of the outdoor units 21 and 22 operates the compressor and outdoor heat exchanger included therein, to perform compression and heat exchange of refrigerant, and supplies the resultant refrigerant to associated ones of the indoor units 31 to 35. Each of the outdoor units 21 and 22 is driven in accordance with a request from the remote control unit 10 or an associated one or ones of the indoor units 31 to 35. Thus, the number of operating outdoor units and the number of operating compressors included in the operating outdoor units is varied as the cooling or heating capacity of the air conditioner is varied in accordance with the number of operating indoor units.

Although the outdoor units 21 and 22 are described in conjunction with the case in which each outdoor unit supplies refrigerant to associated ones of the indoor units, the connection arrangement of the outdoor units and indoor units may be varied such that plural outdoor units are interconnected to supply refrigerant to each indoor unit.

Each of the indoor units 31 to 35 is connected to one of the plural outdoor units 21 and 22 and, as such, receives refrigerant from the outdoor unit connected thereto and discharges cold air to an indoor space. Each of the indoor units 31 to 35 includes an indoor heat exchanger (not shown), an indoor fan (not shown), an expansion valve (not shown) to expand refrigerant supplied thereto, and a plurality of sensors (not shown).

Each of the indoor units 31 to 35 and an associated one of the outdoor units 21 and 22 are connected by a communication line and, as such, receive and transmit data therebetween. Each outdoor unit and each indoor unit are connected to the remote control unit 10 by a separate communication line and, as such, operate under control of the remote control unit 10.

Each of the remote controllers 41 to 45 is connected to an associated one of the indoor units 31 to 35 and, as such, may input a control command from the user to the connected indoor unit, and may receive state information from the connected indoor unit, to display the received state information. In this case, each of the remote controllers 41 to 45 communicates with the indoor unit connected thereto in a wired or wireless manner in accordance with the connection type thereof. In some cases, a single remote controller may be connected to a plurality of indoor units and, as such, setting of the plural indoor units may be changed by an input from the single remote controller.

In addition, each of the remote controllers 41 to 45 may include a temperature sensor equipped therein.

Figure 2:
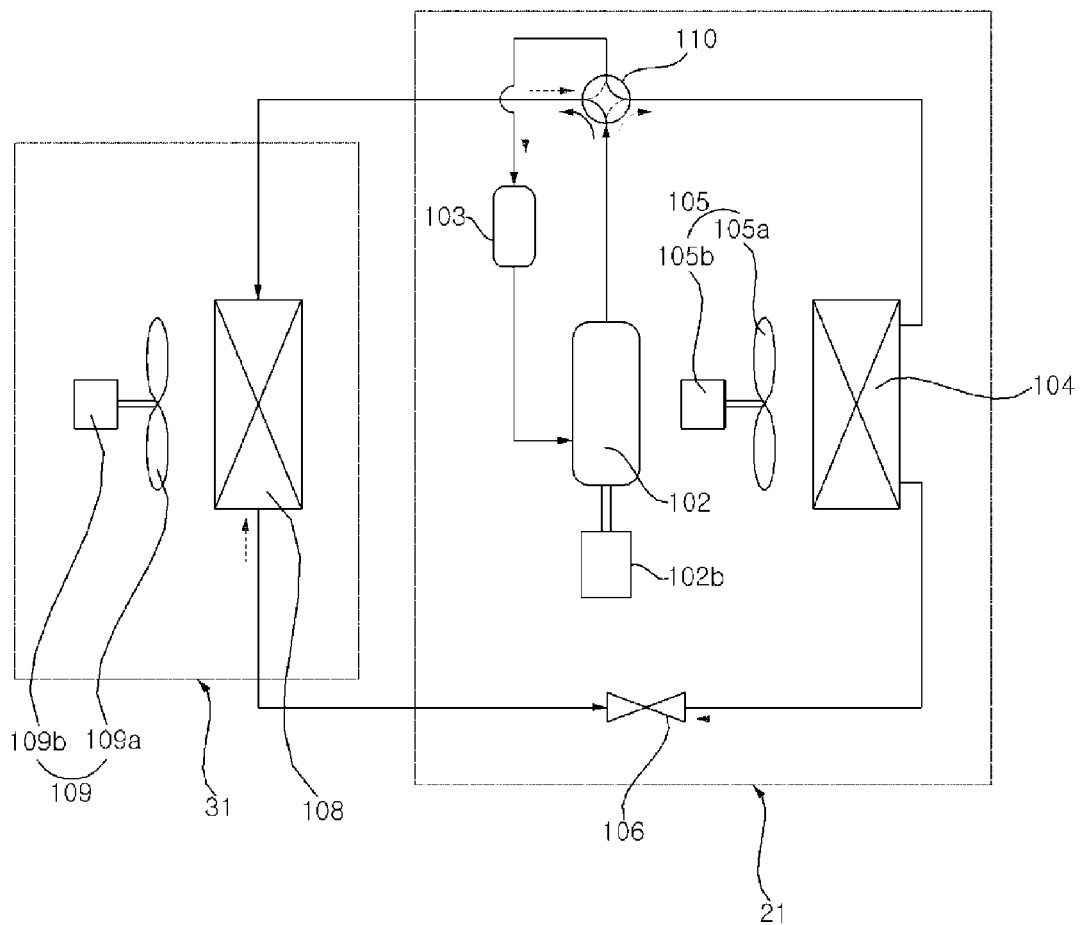
FIG. 2 is a schematic view of one outdoor unit and one indoor unit, which are included in the air conditioner of FIG. 1.

FIG. 2 is a schematic view of one outdoor unit and one indoor unit, which are included in the air conditioner of FIG. 1.

Referring to FIG. 2, the air conditioner, which is designated by reference numeral "50", mainly include an indoor unit, for example, the indoor unit 31, and an outdoor unit, for example, the outdoor unit 21.

The outdoor unit 21 includes a compressor 102 functioning to compress refrigerant, a compressor motor 102b to drive the compressor 102, an outdoor heat exchanger 104 functioning to discharge heat from the compressed refrigerant, and an outdoor blowing unit 105 including an outdoor fan 105a disposed at one side of the outdoor heat exchanger 104, to promote heat discharge of refrigerant, and a motor 105b to rotate the outdoor fan 105a. The outdoor unit 21 further includes an expansion device 106 to expand concentrated refrigerant, a cooling or heating switching valve 110 to change a flow path of compressed refrigerant, and an accumulator 103 to temporarily store gasified refrigerant, and then to supply the stored refrigerant to the compressor at a constant pressure after removing moisture and foreign matter from the refrigerant.

The indoor unit 31 includes an indoor heat exchanger 108 disposed in an indoor space, to perform a cooling or heating function, and an indoor blowing unit 109 including an indoor fan 109a disposed at one side of the indoor heat exchanger 108, to promote heat discharge of refrigerant, and a motor 109b to rotate the indoor fan 109a.

The indoor unit 31 may include at least one indoor heat exchanger 109. As the compressor 102, at least one of an inverter compressor and a constant speed compressor may be used.

Meanwhile, the air conditioner 50 may be configured as a cooler to cool an indoor space. Alternatively, the air conditioner 50 may be configured as a heat pump to cool or heat an indoor space.

Although one indoor unit 31 and one outdoor unit 21 are illustrated in FIG. 2, the air conditioner according to the illustrated embodiment of the present disclosure is not limited thereto. For example, embodiments of the present disclosure are applicable to a multi-type air conditioner including a plurality of indoor units and a plurality of outdoor units, and an air conditioner including a single indoor unit and a plurality of outdoor units.

Figure 3:
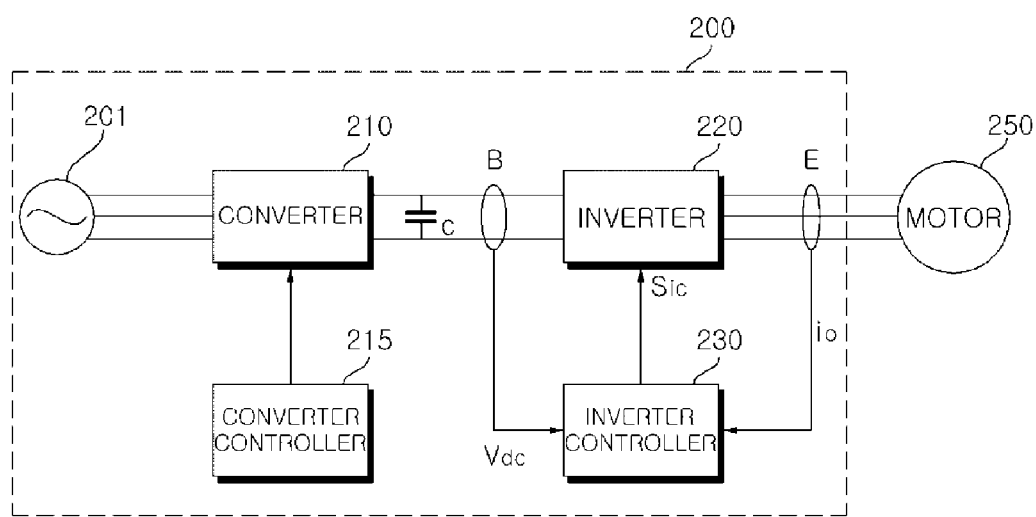
FIG. 3 is a block diagram of a compressor motor driving device equipped in each outdoor unit illustrated in FIG. 1.

FIG. 3 is a block diagram of a compressor motor driving device equipped in each outdoor unit illustrated in FIG. 1.

The compressor 102 included in each outdoor unit illustrated in FIG. 1, for example, the outdoor unit 21, may be driven by a compressor motor driving device 200 to drive the compressor motor 250.

The compressor motor driving device 200 may include an inverter 220 to output 3-phase AC current to the compressor motor 250, an inverter controller 230 to control the inverter 220, and a converter 210 to supply DC power to the inverter 220. The compressor motor driving device 200 may further include a converter controller 215 to control the converter 210.

The motor driving device 200 receives AC power from a power supply system, converts the received power, and then supplies the converted power to the motor 250. In this regard, the motor driving device 200 may be referred to as a "power converting device".

Meanwhile, in accordance with the present disclosure, the converter 210 to supply DC power to the inverter 220 is a converter capable of reducing switching loss generated during power conversion. For example, the converter 210 may be a resonator type interleaved converter. This will be described in detail with reference to FIG. 6.

Such a resonator type interleaved converter may considerably reduce switching loss generated due to soft switching, and may achieve high speed switching. In addition, it may be possible to minimize a reactor component through current alternation. The resonator type interleaved converter may also reduce emission of electromagnetic interference (EMI), as compared to a bridgeless rectifier. This will be described later with reference to FIG. 6.

Referring to FIG. 3, a DC link capacitor C is illustrated. The DC link capacitor may accumulate power output from the converter 210. The power output from the converter 210 is DC power and, as such, the capacitor connected to the converter 210 may be referred to as a "DC link capacitor".

The converter controller 215 may control the converter 210, which is equipped with at least one switching element.

When the converter 210 is a resonator type interleaved converter in accordance with an embodiment of the present disclosure, the converter controller 215 may output switching control signals for a plurality of switching elements.

The inverter 220 may include a plurality of inverter switching elements, to convert smoothed DC power into 3-phase AC power having a predetermined frequency and then to output the 3-phase AC power to the compressor motor 250, which may be a 3-phase motor, in accordance with ON or OFF operations of the switching elements.

In detail, the inverter 220 includes a plurality of switching elements. For example, the inverter 220 includes three pairs of arm switching elements connected in parallel. Each arm switching element pair includes an upper arm switching element and a lower arm switching element, which are connected in series. A diode is connected to each arm switching element in anti-parallel.

The inverter controller 230 may output an inverter switching control signal Sic to the inverter 220, to control switching operation of the inverter 220. The inverter switching control signal Sic is a pulse width modulated (PWM) switching control signal. The inverter switching control signal Sic may be generated, based on output a current io flowing through the motor 250 or a DC link voltage Vdc across the DC link capacitor C. In this case, the output current io may be detected by an output current detector E, and the DC link voltage Vdc may be detected by a DC link voltage detector B.

The output current detector E may detect the output current io flowing between the inverter 220 and the motor 250. That is, the output current detector E detects current flowing through the motor 250. The output current detector E may detect output currents of all phases, namely, output current ia, ib, and ic. Alternatively, the output current detector E may detect output currents of two phases through balance of three phases.

The output current detector E may be arranged between the inverter 220 and the motor 250. For current detection, a current transformer (CT), a shunt resistor, or the like may be employed as the output current detector E.

The inverter controller 230 may include an axial transformer (not shown), a velocity calculator (not shown), a current command generator (not shown), a voltage command generator (not shown), and a switching control signal output unit (not shown).

The axial transformer (not shown) receives 3-phase output currents ia, ib, and ic detected by the output current detector E, and transforms the 3-phase output currents ia, ib, and ic into two-phase currents iα and iβ in a stationary reference frame.

Meanwhile, the axial transformer (not shown) may transform the two-phase currents ia and iβ in the stationary reference frame into 2-phase currents id and iq in a rotating reference frame.

The velocity calculator (not shown) may calculate a velocity $\hat{\omega}$, based on a rotor position signal H input from a position sensor (not shown). That is, it is possible to calculate the velocity $\hat{\omega}$, by dividing a rotor position based on the position signal by time.

Meanwhile, the position sensor (not shown) may sense a rotor position of the motor 250. For this function, the position sensor (not shown) may include a Hall sensor.

Meanwhile, the velocity calculator (not shown) may output a position $\hat{\theta}_r$ and a velocity $\hat{\omega}_r$, which are calculated, based on the rotor position signal H input to the velocity calculator.

Meanwhile, the current command generator (not shown) calculates a velocity command value ω*r, based on the calculated velocity $\hat{\omega}$, and a target velocity ω. The current command generator (not shown) also generates a current command value i*q, based on the velocity command value ω*r. For example, the current command generator (not shown) may perform proportional-integral (PI) control through a PI controller included therein, based on a difference between the calculated velocity $\hat{\omega}$, and the target velocity ω, namely, the velocity command value ω*r, and, as such, may generate a current command value i*q. Although the current command generator generates the current command value i*q, namely, a q-axis current command value, it may be possible to generate a d-axis current command value i*d, together with the q-axis current command value i*q. The d-axis current command value i*d may be set to "0".

Meanwhile, the current command generator (not shown) may further include a limiter (not shown) to limit the level of the current command value i*q in order to prevent the current command value i*q from being outside a predetermined range.

The voltage command generator (not shown) generates d and q-axis voltage command values v*d and v*q, based on d and q-axis currents id and iq generated through axial transformation to a 2-phase rotating reference frame in the axial transformer and current command values i*d and i*q from the current command generator (not shown). For example, the voltage command generator (not shown) may perform PI control through the PI controller, based on a difference between the q-axis current iq and the q-axis current command value i*q and, as such, may generate a q-axis voltage command value v*q. The voltage command generator (not shown) may additionally perform PI control through the PI controller, based on a difference between the d-axis current id and the d-axis current command value i*d and, as such, may generate a d-axis voltage command value v*d. When the d-axis current command value i*d is set to "0", the d-axis voltage command value v*d may be set to "0".

Meanwhile, the voltage command generator (not shown) may further include a limiter (not shown) to limit the levels of the voltage command values v*d and v*q in order to prevent the voltage command values v*d and v*q from being outside a predetermined range.

The generated d and q-axis voltage command values v*d and v*q are input to the axial transformer (not shown).

The axial transformer (not shown) receives the position $\hat{\theta}$, calculated by the velocity calculator (not shown) and the d and q-axis voltage command values v*d and v*q and, as such, perform axial transformation.

First, the axial transformer (not shown) performs transformation from a 2-phase rotating reference frame to a 2-phase stationary reference frame. In this case, the position $\hat{\theta}$, calculated by the velocity calculator (not shown) may be used.

The axial transformer (not shown) performs transformation from a 2-phase stationary reference frame to a 3-phase stationary reference frame. Through the axial transformation, the axial transformer (not shown) outputs 3-phase output voltage command values v*a, v*b, and v*c.

The switching control signal output unit (not shown) generates an inverter switching control signal Sic according to PWM, based on the 3-phase output voltage command values v*a, v*b, and v*c.

The inverter switching control signal Sic output from the switching control signal output unit (not shown) may be converted into a gate drive signal in a gate driver (not shown). The gate drive signal may be input to the gate of each switching element in the inverter 220. As a result, the switching elements in the inverter 220 perform switching operations, respectively.

Figure 4A:
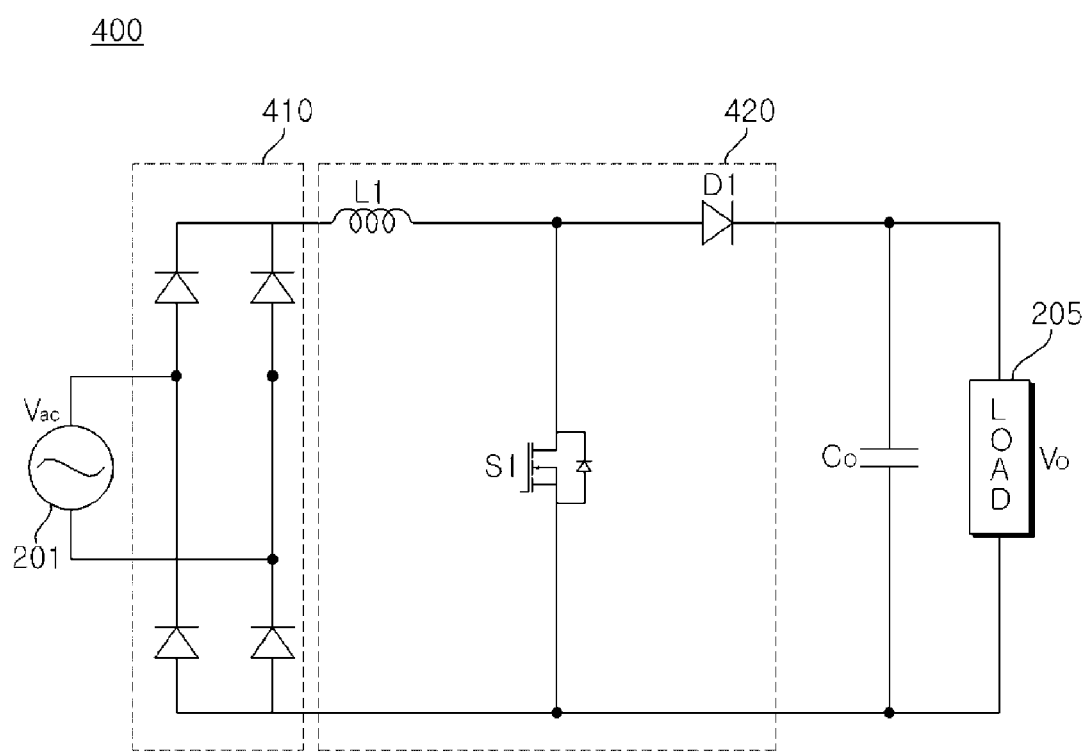
FIG. 4A illustrates an example of a converter.
Figure 4B:
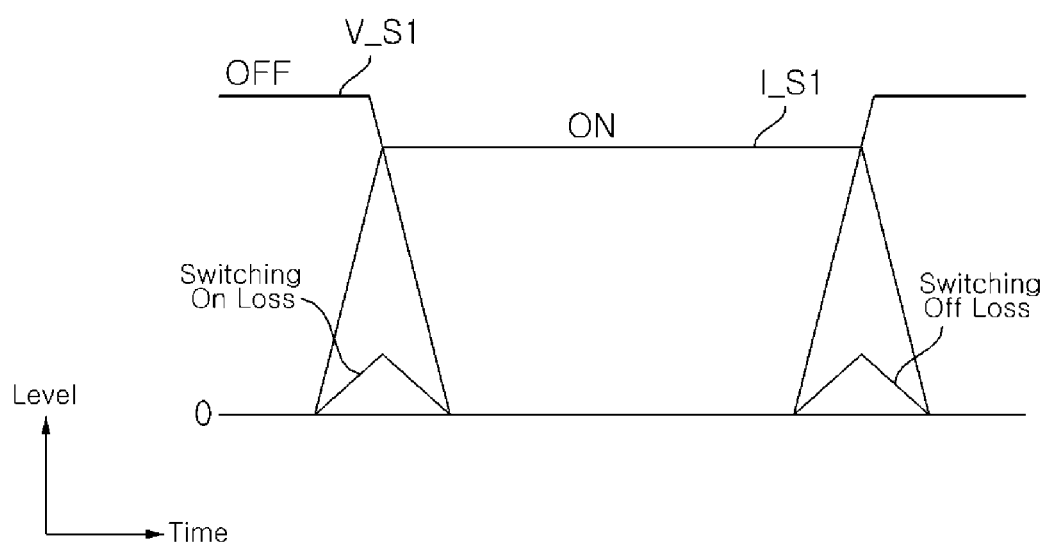
FIG. 4B is a diagram explaining operation of the converter illustrated in FIG. 4A.

FIG. 4A illustrates an example of the converter. FIG. 4B is a diagram explaining operation of the converter illustrated in FIG. 4A.

In particular, FIG. 4A illustrates a boost converter included in a power converting device. The power converting device of FIG. 4A, which is designated by reference numeral "400", includes a rectifier 410, a boost converter 420, a capacitor Co, and a load 205.

The boost converter 420 may have a configuration in which a switching element S1 is connected between an inductor L1 and a diode D1. When the switching element S1 turns on, energy is stored in the inductor L1. When the switching element S1 turns off, the energy stored in the inductor L1 is output via the diode D1.

Switching loss depicted in FIG. 4B is generated when the switching element S1 is turned on or off. This is because the voltage and current of the switching element S1, namely, a voltage V_S1 and a current I_S1, are not ideally increased or decreased, but are gradually increased or decreased.

Figure 5A:
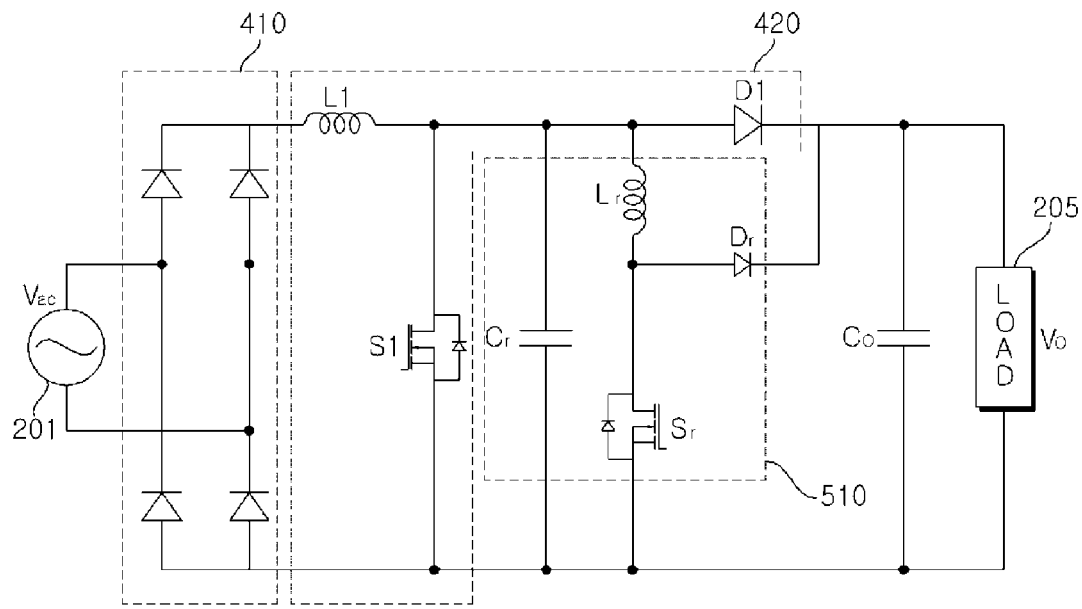
FIG. 5A illustrates another example of the converter.

In order to reduce such switching loss, various methods have been proposed. FIG. 5A illustrates a resonator type converter as an example of a switching loss reduction method.

Figure 5B:
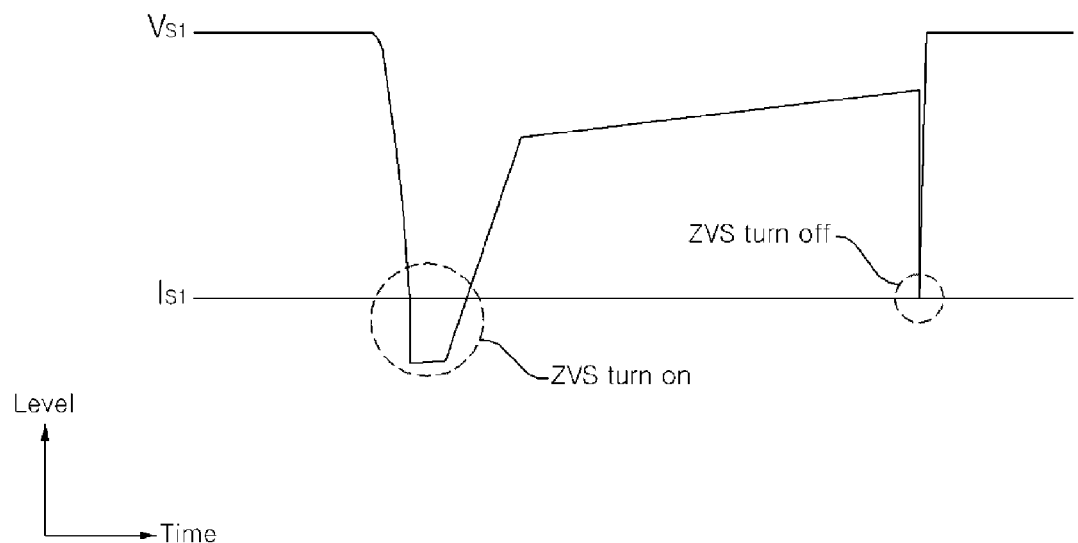
FIGS. 5B to 5D are diagrams explaining operation of the converter illustrated in FIG. 5A.
Figure 5C:
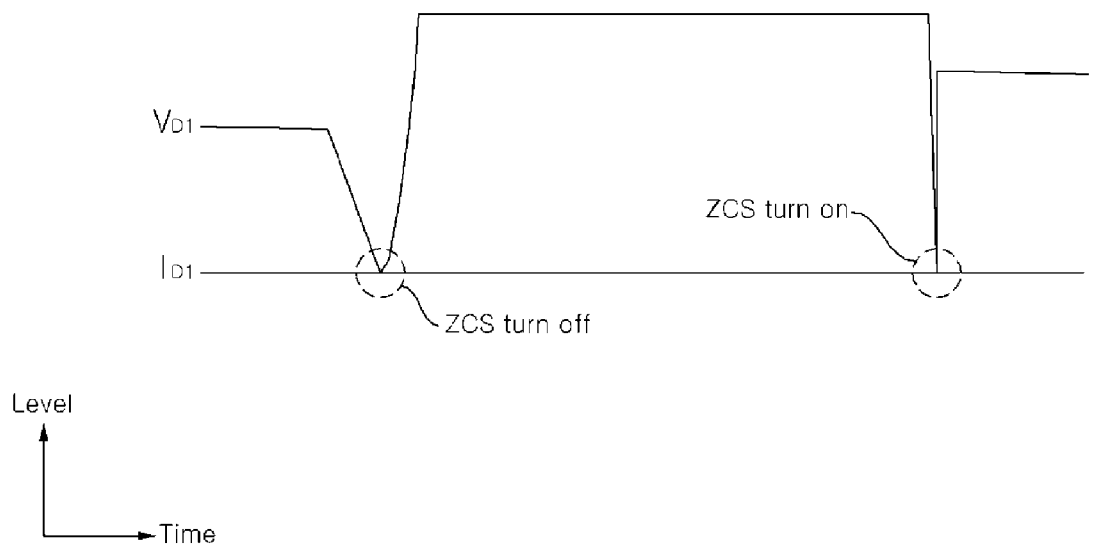
Figure 5D:
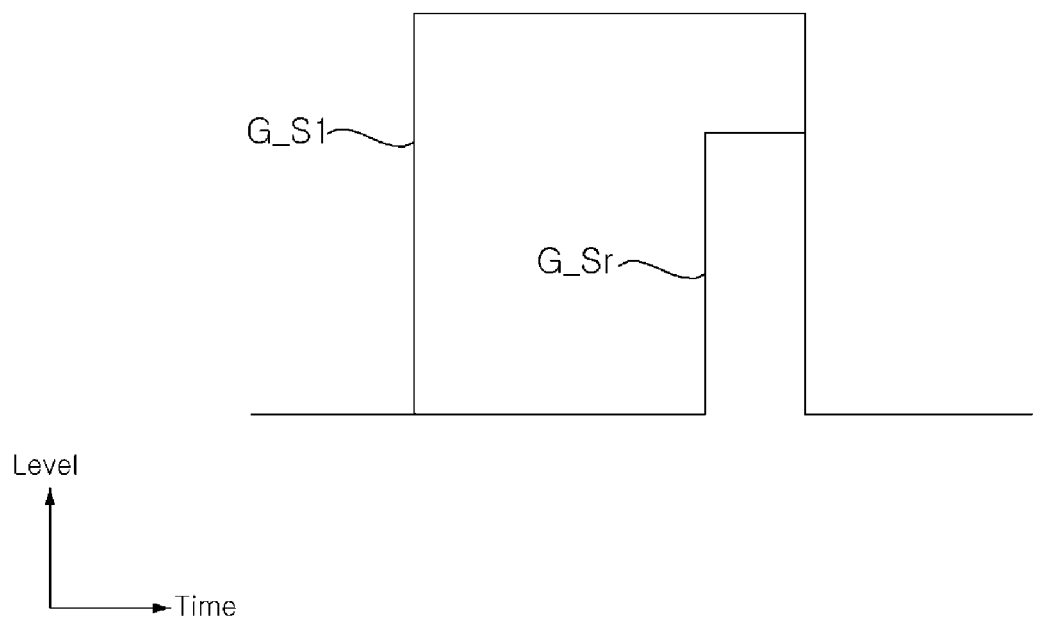

FIG. 5A illustrates another example of the converter. FIGS. 5B to 5D are diagrams explaining operation of the converter illustrated in FIG. 5A.

In FIG. 5A, a power converting device 500 is illustrated. The power converting device 500 is similar to the power converting device 400 of FIG. 4A, except that the power converting device 500 further includes a resonator 510 constituted by an active element. That is, the power converting device 500 of FIG. 5A includes a rectifier 410, a boost converter 420, a resonator 510, a capacitor Co, and a load 205.

The resonator 510 is connected to the boost converter 420. The resonator 510 includes a capacitor Cr connected to a switching element S1 of the boost converter 420 in parallel, and an inductor Lr and a switching element Sr, which are connected to the capacitor Cr in parallel while being connected to each other in series. The resonator 510 further includes a diode Dr connected, at one end thereof, between the inductor Lr and the switching element Sr while being connected, at the other end thereof, to a diode D1 of the boost converter 420.

The turn-on timing G_Sr of the switching element Sr in the resonator 510 should be set to be within the turn-on timing G_S1 of the switching element S1 of the boost converter 420, as shown in FIG. 5D.

Accordingly, zero voltage switching (ZVS) turn-on and ZVS turn-off as illustrated in FIG. 5B are possible, and zero current switching (ZCS) turn-on and ZCS turn-off are possible.

Meanwhile, the resonator 510, which is an active type, employs a separate switching element Sr. For this reason, separate control for the switching element Sr is required. Furthermore, there is a limitation on the turn-on timing G_Sr of the switching element Sr in the resonator 510 in that the turn-on timing G_Sr of the switching element Sr should be set to be within the turn-on timing G_S1 of the switching element in the boost converter 420, as shown in FIG. 5D.

Hereinafter, a resonator type interleaved converter, which includes a resonator equipped with a passive element in accordance with an embodiment of the present disclosure, to eliminate the above-mentioned problems, will be described.

Figure 6:
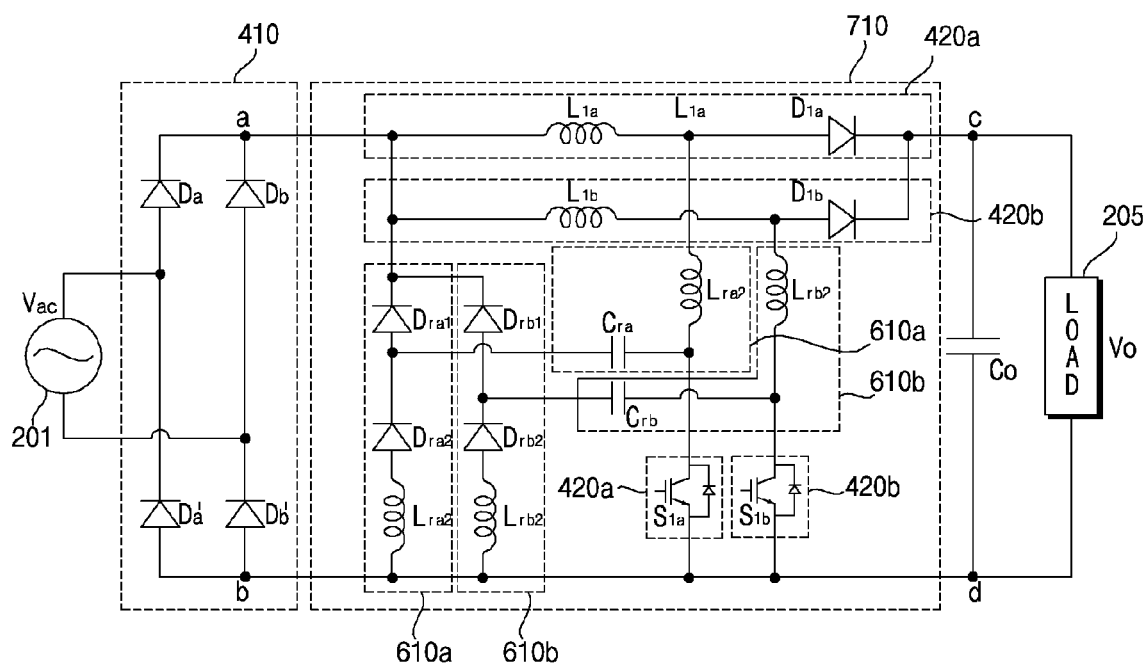
FIG. 6 is a circuit diagram of a motor driving device according to an embodiment of the present disclosure.
Figure 7:
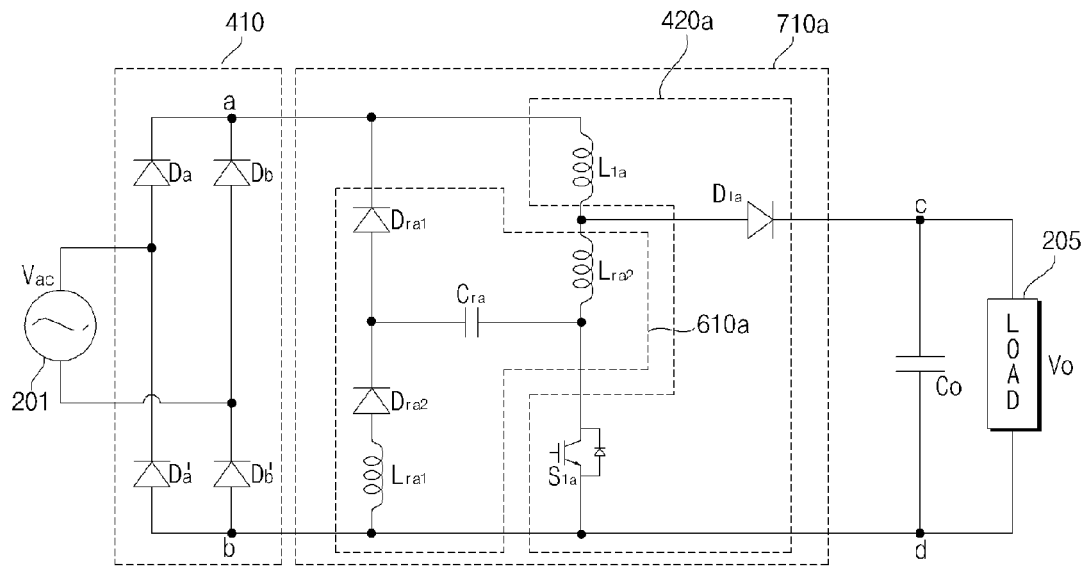
FIG. 7 is a diagram illustrating the converter of FIG. 6 in a state in which first and second converters included in the converter of FIG. 6 are separated from each other.
Figure 7:
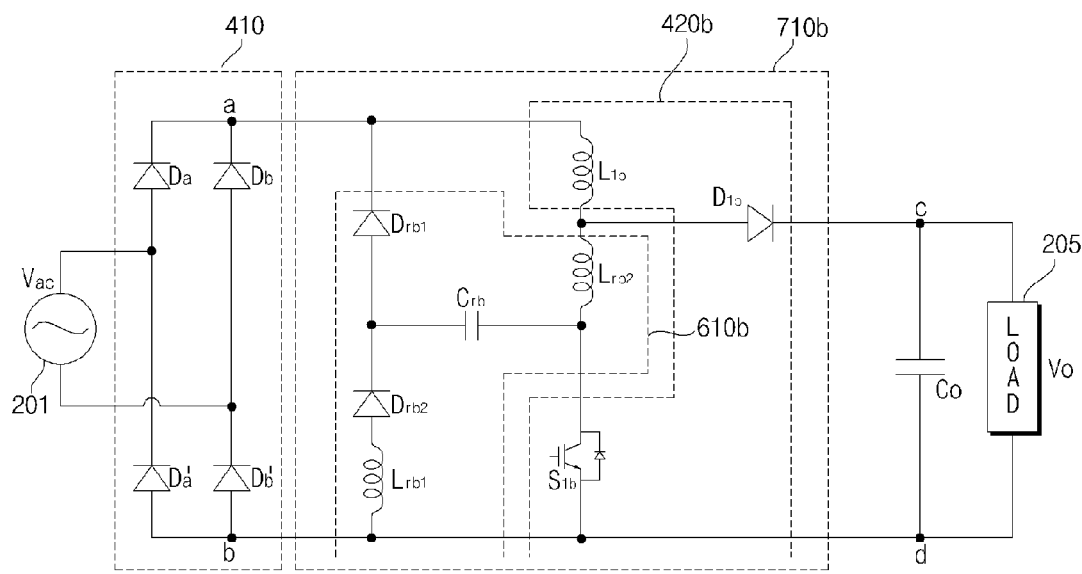

FIG. 6 is a circuit diagram of a motor driving device according to an embodiment of the present disclosure. FIG. 7 is a diagram illustrating the converter of FIG. 6 in a state in which first and second converters included in the converter of FIG. 6 are separated from each other.

Here, the load illustrated in FIG. 6, namely, a load 205, may be generalized to include the inverter 220 and motor 250 illustrated in FIG. 3.

The rectifier illustrated in FIG. 6, namely, a rectifier 710, rectifies single-phase AC power 201 input thereto, and outputs the rectified power.

To this end, the rectifier includes two pairs of arm switching elements connected in parallel, namely, a pair of arm switching elements Dra1 and Dra2 and a pair of arm switching elements Drb1 and Drb2. Each arm switching element pair includes one upper arm switching element Dra1 or Drb1 and one lower arm switching element Dra2 or Drb2, which are connected in series. That is, the arm switching elements may be connected in a bridge type.

The converter illustrated in FIG. 6, namely in FIG. 7, a converter 710, may include a first converter 710a and a second converter 710b, which are connected in parallel, and operate in an interleaved manner.

The first converter 710a may include a first boost converter 420a, and a first resonator 610a to perform resonation. The first resonator 610a may include a passive element.

The first boost converter 420a includes a first inductor L1a, a first diode D1a connected to the first inductor L1a, and a first switching element S1a connected between the first inductor L1a and the first diode D1a.

That is, the first inductor L1a is connected, at one end thereof, to the rectifier 410 while being connected, at the other end thereof, to the anode of the first diode D1a. The cathode of the first diode D1a is connected to a dc link capacitor Co. The first switching element S1a may be connected between the first inductor L1a and the first diode D1a and between the first inductor L1a and one end of the dc link capacitor Co, namely, a node d.

The first resonator 610a may include a first resonating diode as the arm switching element Dra1, a second resonating diode as the arm switching element Dra2, a first resonating inductor Lra1, a second resonating inductor Lra2, and a first resonating capacitor Cra.

The first resonating diode Dra1, second resonating diode Dra2, and first inductor Lra1 are connected in series between both ends a and b of the rectifier 410.

The second resonating inductor Lra2 may be connected between the first inductor L1a of the first boost converter 420a and the first switching element S1a. The first resonating capacitor Cra may be connected between the first resonating diode Dra1 and the second resonating diode Dra2 and between the second resonating inductor Lra2 and the first switching element S1a.

The second boost converter 420b includes a second inductor L1b, a second diode D1b connected to the second inductor L1b, and a second switching element S1b connected between the second inductor L1b and the second diode D1b.

That is, the second inductor L1b is connected, at one end thereof, to the rectifier 410 while being connected, at the other end thereof, to the anode of the second diode D1b. The cathode of the second diode D1b is connected to the dc link capacitor Co. The second switching element S1b may be connected between the second inductor L1b and the second diode D1b and between the second inductor L1b and one end of the dc link capacitor Co, namely, the node d.

The second resonator 610b may include a third resonating diode as the arm switching element Drb1, a fourth resonating diode as the arm switching element Drb2, a third resonating inductor Lrb1, a fourth resonating inductor Lrb2, and a second resonating capacitor Cra.

The third resonating diode Drb1, fourth resonating diode Drb2, and third inductor Lrb1 are connected in series between both ends a and b of the rectifier 410.

The fourth resonating inductor Lrb2 may be connected between the second inductor L1b of the second boost converter 420b and the second switching element S1b. The second resonating capacitor Crb may be connected between the third resonating diode Drb1 and the fourth resonating diode Drb2 and between the fourth resonating inductor Lrb2 and the second switching element S1b.

FIGS. 8A to 8H are diagrams explaining operation of the first converter illustrated in FIG. 7.

Figure 8A:
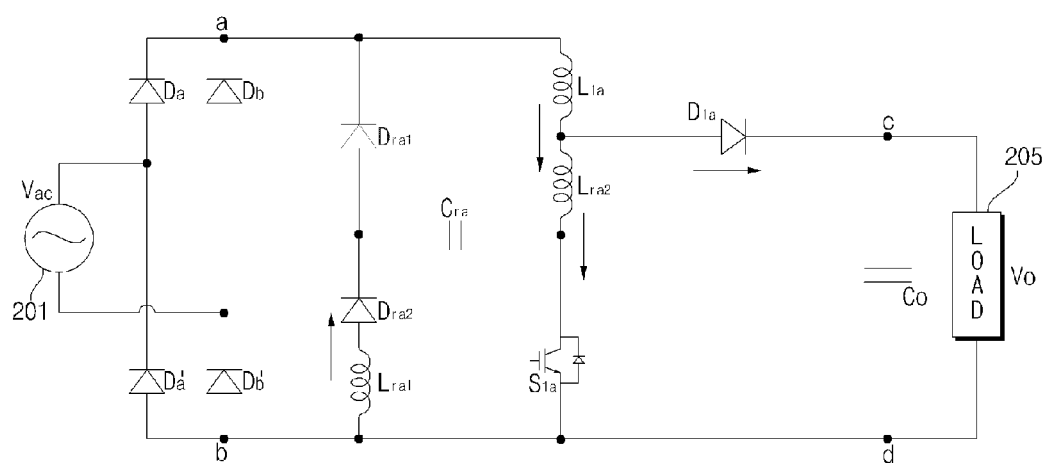
FIGS. 8A to 8H are diagrams explaining operation of the first converter illustrated in FIG. 7.

Referring to FIG. 8A, the second resonating diode Dra2 and first switching element S1a are first turned on in an OFF state of the first resonating diode Dra1 in the first converter 710a. Accordingly, the first resonating inductor Lra1 and first resonating capacitor Cra resonate. In this case, the first switching element S1a performs ZVS, based on a current flowing through the first resonating inductor Lra1 and a current flowing through the second resonating inductor Lra2.

Figure 8B:
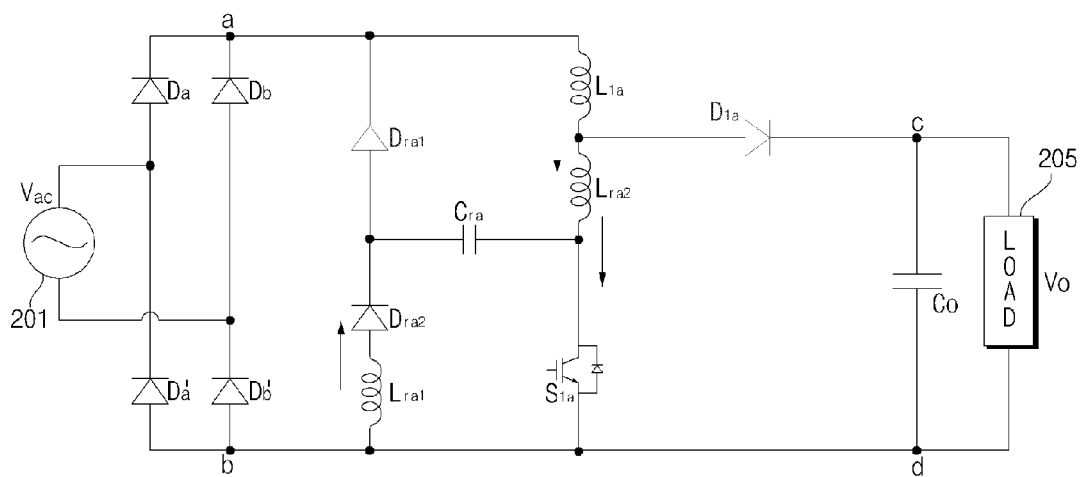

Thereafter, referring to FIG. 8B, the first diode D1a is turned off when the current flowing through the first inductor L1a and the current flowing through the first resonating inductor Lra1 become equal under the condition that the first resonating diode Dra1 is maintained in an OFF state, and the second resonating diode Dra2 and first switching element S1a are maintained in an ON state. As a result, the voltage across the first resonating capacitor Cra becomes equal to a negative input voltage.

Figure 8C:
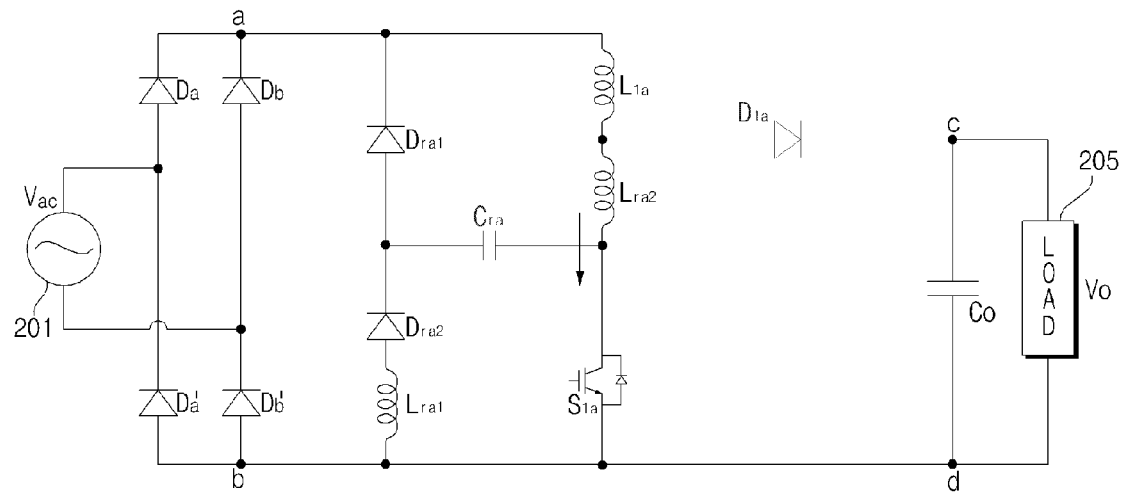

Referring to FIG. 8C, the first resonating diode Dra1 is then turned on under the condition that the second resonating diode Dra2 and first switching element S1a are maintained in an ON state. As a result, a current flows through the first resonating inductor Lra1, first resonating diode Dra1, second resonating diode Dra2, first inductor L1a, second resonating inductor Lra2, and first switching element S1a. Meanwhile, the current continuously flows through the above-described current path until the current flowing through the first resonating inductor Lra1 becomes zero. In this case, the first diode D1a is maintained in an OFF state.

Figure 8D:
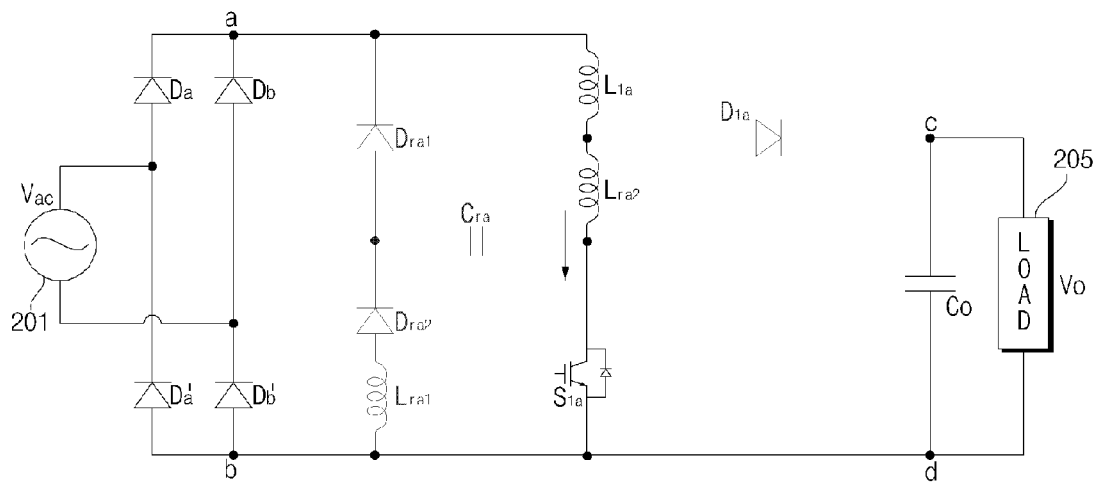

Referring to FIG. 8D, the first resonating diode Dra1 and second resonating diode Dra2 are then turned off under the condition that the first switching element S1a is maintained in an ON state. As a result, a current flows through the first inductor L1a, second resonating inductor Lra2, and first switching element S1a. In this case, the first diode D1a is maintained in an OFF state.

Figure 8E:
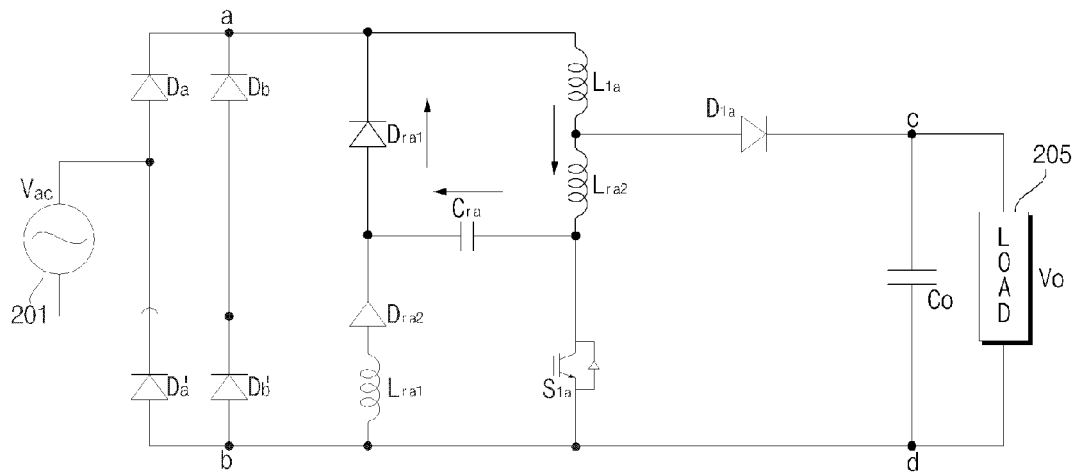

Referring to FIG. 8E, the first resonating diode Dra1 is subsequently turned on under the condition that the second resonating diode Dra2 is maintained in an OFF state. As a result, a current flows through the first inductor L1a, second resonating inductor Lra2, first resonating capacitor Cra, and first resonating diode Dra1. In this case, the first diode D1a is maintained in an OFF state.

In accordance with the above-described operations, the voltage across the first switching element S1a is gradually raised in accordance with movement of energy from the first resonating capacitor Cra. When the first switching element S1a performs ZCS when turned off.

Figure 8F:
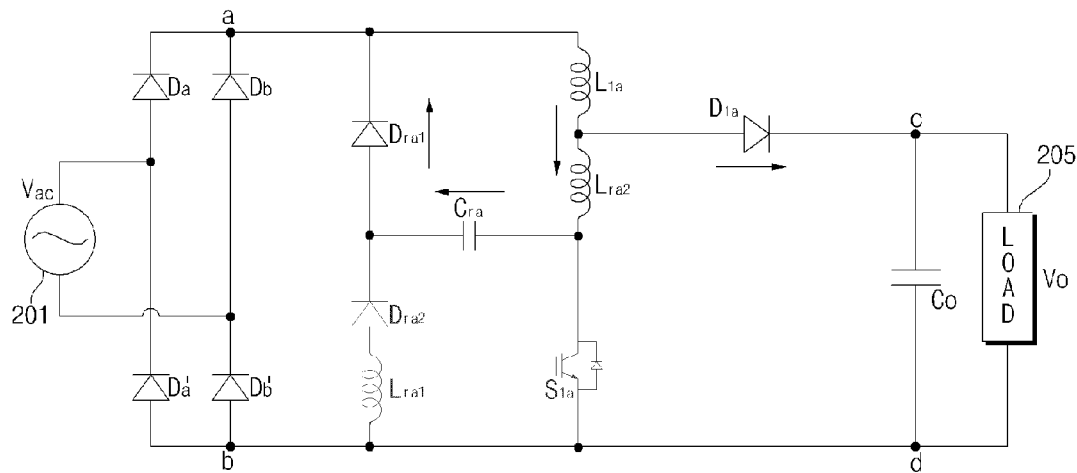

Referring to FIG. 8F, when the voltage between the first switching element S1a and the second resonating inductor Lra2 then become equal to an output voltage under the condition that the second resonating diode Dra2 and first switching element S1a are maintained in an OFF state, and the first resonating diode Dra1 is maintained in an ON state, the first diode D1a is turned on.

Accordingly, the second resonating inductor Lra2 and first resonating capacitor Cra resonate. This resonation is continued until the current flowing through the second resonating inductor Lra2 becomes zero.

Figure 8G:
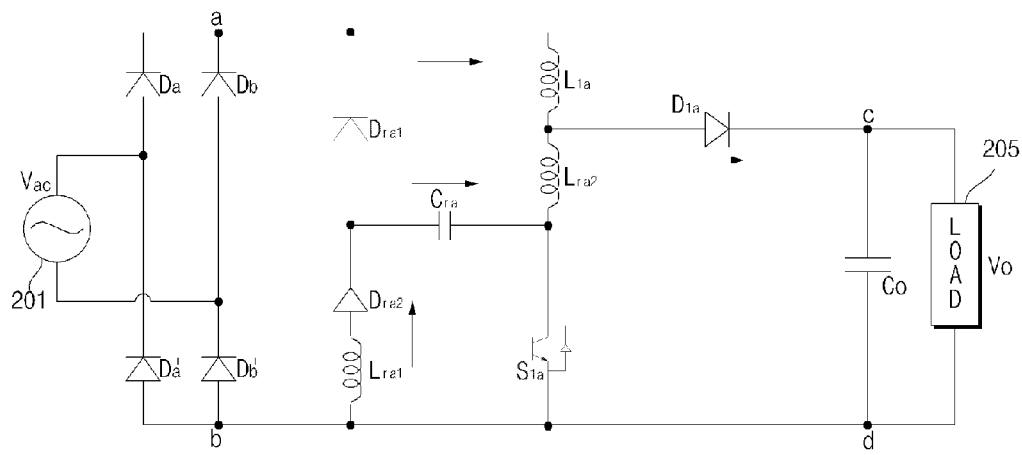

Referring to FIG. 8G, the first resonating diode Dra1 is then turned off, and the second resonating diode Dra2 is turned on. In this case, the first switching element S1a is maintained in an OFF state. Accordingly, the current flowing through the first inductor L1a and the current flowing through the first and second resonating inductors Lra1 and Lra2 flows to the first diode D1a, as an output current.

The output current flows continuously until the resonating current flowing through the first and second resonating inductor Lra1 and Lra2 becomes zero.

Figure 8H:
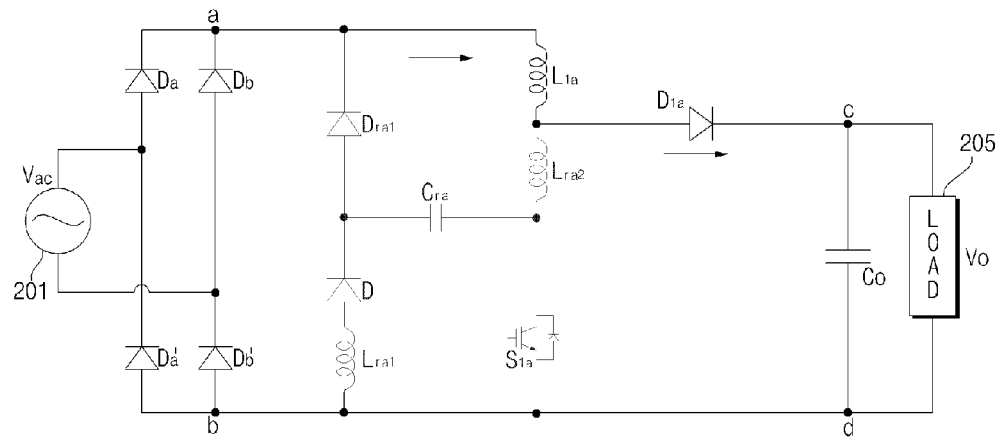

Referring to FIG. 8H, the second resonating diode Dra2 is then turned off under the condition that the first resonating diode Dra1 and first switching element S1a are in an OFF state.

As a result, the input current flows directly to the first diode D1a via the first inductor L1a.

Meanwhile, the operation of the first converter 710a described with reference to FIGS. 8A to 8H is applicable to the second converter 710b, which operates in an interleaved manner, without any change.

Figure 9:
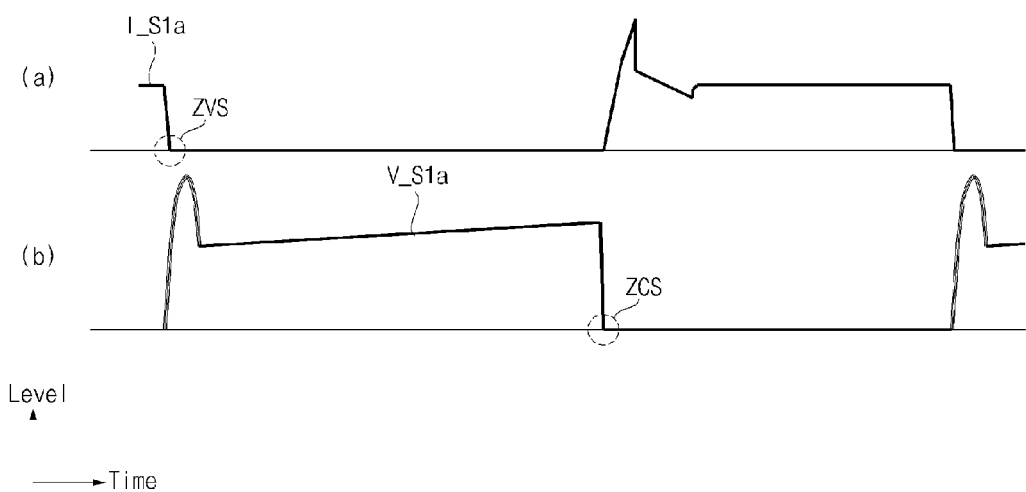
FIG. 9 is a diagram depicting current and voltage waveforms in the first switching element of FIG. 7.

FIG. 9 is a diagram depicting current and voltage waveforms in the first switching element of FIG. 7.

FIG. 9(a) illustrates a waveform I_S1a of a current flowing through the first switching element S1a. FIG. 9(b) illustrates a waveform V_S1a of a voltage across the first switching element S1a.

In particular, FIG. 9 illustrates ZVS performed when the first switching element S1a is turned on in the case of FIG. 8A, and ZCS performed when the first switching element S1a is turned on in the case of FIG. 8A, and ZCS performed when the first switching element S1a is turned off in the case of FIG. 8E.

In accordance with one aspect of the present disclosure, each of the motor driving device and the air conditioner including the same includes a rectifier to rectify input AC power, and a converter to convert the power rectified by the rectifier into DC power. The converter includes an interleaved converter including a first converter and a second converter, which operate in an interleaved manner. The first converter of the interleaved converter includes a first boost converter, and a first resonator including a passive element connected to the first boost converter, to perform resonation. Accordingly, it is possible to reduce switching loss generated upon power conversion.

In particular, in accordance with the resonator type interleaved inverter, it may be possible to considerably reduce switching loss generated due to soft switching, and to achieve high speed switching. In addition, it may be possible to minimize a reactor component through current alternation. The resonator type interleaved converter may also reduce emission of electromagnetic interference (EMI), as compared to a bridgeless rectifier.

The motor driving device according to the present disclosure and the air conditioner including the same are not limited to configurations and methods according to the above-described embodiments. The above-described embodiments may be completely or partially combined to implement various alterations.

Meanwhile, the operation method of the motor driving device or air conditioner according to the present disclosure can be realized as a code, which can be written on a recording medium that can be read by a processor equipped in the motor driving device or air conditioner and can be read by a processor. The recording medium that can be read by a processor includes all kinds of recording media, on which data that can be read by a processor is written, such as a read only memory (ROM), a random access memory (RAM), a CD-ROM, a magnetic tape, a floppy disk, an optical data storage, and a carrier wave type (e.g., transmission over the Internet). The recording medium that can be read by a processor can be dispersed into computer systems connected to one another on a network, and codes that can be read by a processor can be stored in the recording medium in a dispersion manner and can be performed.

It is an object of the present disclosure to provide a motor driving device capable of reducing switching loss generated upon power conversion and an air conditioner including the same.

In accordance with an aspect of the present disclosure, the above and other objects can be accomplished by the provision of a motor driving device including a rectifier to rectify input AC power, and a converter to convert the power rectified by the rectifier into DC power, wherein the converter includes an interleaved converter including a first converter and a second converter, the first and second converters operating in an interleaved manner, wherein the first converter of the interleaved converter includes a first boost converter, and a first resonator including a passive element connected to the first boost converter, to perform resonation.

In another aspect of the present disclosure, there is provided an air conditioner including a compressor to compress a refrigerant, a heat exchanger to perform heat exchange, using the compressed refrigerant, and a compressor motor driving device to drive a motor equipped in the compressor, wherein the compressor motor driving device includes a rectifier to rectify input AC power, and a converter to convert the power rectified by the rectifier into DC power, wherein the converter includes an interleaved converter including a first converter and a second converter, the first and second converters operating in an interleaved manner, wherein the first converter of the interleaved converter includes a first boost converter, and a first resonator including a passive element connected to the first boost converter, to perform resonation.

In another aspect of the present disclosure, there is provided a motor driving device including a rectifier to rectify input AC power, and a converter to convert the power rectified by the rectifier into DC power, wherein the converter includes boost converter, and a resonator connected to the boost converter, to perform resonation.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving device comprising:
   a rectifier configured for coupling to an AC power source; and
   an interleaved converter coupled to the rectifier to convert an output of the rectifier into a DC level, wherein
   the interleaved converter includes a first converter and a second converter configured to operate in an interleaved manner, and
   the first converter includes a first boost converter and a first resonator having a first LC circuit coupled to the first boost converter to perform resonation,
   wherein the first resonator includes:
      a first resonating diode, a second resonating diode, and a first resonating inductor coupled in series between first and second nodes of the rectifier,
      a first resonating capacitor coupled between the first resonating diode and the second resonating diode, and
      a second resonating inductor coupled to the first resonating capacitor, and
      the first boost converter includes a first inductor and a first diode coupled to the second resonating inductor, and a first switch coupled to the second resonating inductor.

2. The motor driving device according to claim 1, wherein the second converter of the interleaved converter includes a second boost converter, and a second resonator having a second LC circuit coupled to the second boost converter to perform resonation.

3. The motor driving device according to claim 2, wherein:
   the second resonator includes:
      a third resonating diode, a fourth resonating diode, and a third resonating inductor coupled in series between the first and second nodes of the rectifier,
      a second resonating capacitor coupled between the third resonating diode and the fourth resonating diode, and
      a fourth resonating inductor coupled to the second resonating capacitor, and
   the second boost converter includes a second inductor and a second diode coupled to the fourth resonating inductor, and a second switch coupled to the fourth resonating inductor.

4. The motor driving device according to claim 1, wherein the first switch performs zero voltage switching based on a current flowing through the first resonating inductor and a current flowing through the second resonating inductor when the second resonating diode and the first switching element are turned on in an OFF state of the first resonating diode in the first converter.

5. The motor driving device according to claim 4, wherein the first diode is turned off when the current flowing through the first inductor and the current flowing through the first resonating inductor become equal under a condition that the first resonating diode is maintained in an OFF state and the second resonating diode and the first switch are maintained in an ON state.

6. The motor driving device according to claim 1, wherein a voltage across the first switch gradually increases when the first resonating diode is turned on and the first switch is turned off under a condition that the second resonating diode is maintained in an OFF state, and the first switch performs zero current switching when turned off.

7. The motor driving device according to claim 6, wherein the first diode is turned on when a voltage between the switch and the second resonating inductor become equal to an output voltage under a condition that the second resonating diode and the first switch are maintained in an OFF state and the first resonating diode is maintained in an ON state.

8. The motor driving device according to claim 1, further comprising:
   a DC link capacitor coupled between output nodes of the interleaved converter;
   an inverter having a plurality of switching elements, the inverter using an energy stored in the DC link capacitor; and
   an inverter controller to control the inverter.

9. An air conditioner comprising:
   a compressor to compress a refrigerant;
   a heat exchanger to perform heat exchange, using the compressed refrigerant; and
   a compressor motor driving device to drive a motor equipped in the compressor,
   wherein the compressor motor driving device comprises:
      a rectifier configured for coupling to an AC power source, and
      an interleaved converter coupled to the rectifier to convert an output of the rectifier into a DC level, the interleaved converter having a first converter and a second converter configured to operate in an interleaved manner, the first converter having a first boost converter and a first resonator, and the first resonator having a first LC circuit coupled to the first boost converter to perform resonation,
      wherein the first resonator includes:

a first resonating diode, a second resonating diode, and a first resonating inductor coupled in series between first and second nodes of the rectifier, a first resonating capacitor coupled between the first resonating diode and the second resonating diode, and a second resonating inductor coupled to the first resonating capacitor, and the first boost converter includes a first inductor and a first diode coupled to the second resonating inductor, and a first switch coupled to the second resonating inductor.

10. The air conditioner according to claim 9, wherein the first switch performs zero voltage switching based on a current flowing through the first resonating inductor and a current flowing through the second resonating inductor when the second resonating diode and the first switching element are turned on in an OFF state of the first resonating diode in the first converter.

11. The air conditioner according to claim 10, wherein the first diode is turned off when the current flowing through the first inductor and the current flowing through the first resonating inductor become equal under a condition that the first resonating diode is maintained in an OFF state and the second resonating diode and the first switch are maintained in an ON state.

12. The air conditioner according to claim 9, wherein a voltage across the first switch gradually increases when the first resonating diode is turned on, and the first switching element is turned off under a condition that the second resonating diode is maintained in an OFF state, and the first switch performs zero current switching when turned off.

13. The air conditioner according to claim 12, wherein the first diode is turned on when a voltage between the first switch and the second resonating inductor become equal to an output voltage under a condition that the second resonating diode and the first switch are maintained in an OFF state and the first resonating diode is maintained in an ON state.

14. A motor driving device comprising:
a rectifier to rectify input AC power; and
a converter to convert the power rectified by the rectifier into DC power, wherein the converter includes a boost converter and a resonator connected to the boost converter to perform resonation, wherein the resonator includes:
a first resonating diode, a second resonating diode, and a first resonating inductor coupled in series between first and second nodes of the rectifier, a first resonating capacitor coupled between the first resonating diode and the second resonating diode, and a second resonating inductor coupled to the first resonating capacitor, and the boost converter includes a first inductor and a first diode coupled to the second resonating inductor, and a first switch coupled to the second resonating inductor.

15. The motor driving device according to claim 14, wherein the first switch performs zero voltage switching based on a current flowing through the first resonating inductor and a current flowing through the second resonating inductor when the second resonating diode and the first switch are turned on in an OFF state of the first resonating diode in the resonator.

16. The motor driving device according to claim 15, wherein a voltage across the first switch gradually increases when the first resonating diode is turned on and the first switch is turned off under a condition that the second resonating diode is maintained in an OFF state, and the first switch performs zero current switching when turned off.

17. The motor driving device according to claim 14, further comprising:
a DC link capacitor coupled to output nodes of the converter;
an inverter having a plurality of switching elements, the inverter using an energy stored in the DC link capacitor; and
an inverter controller to control the inverter.

* * * * *